Figure 1:
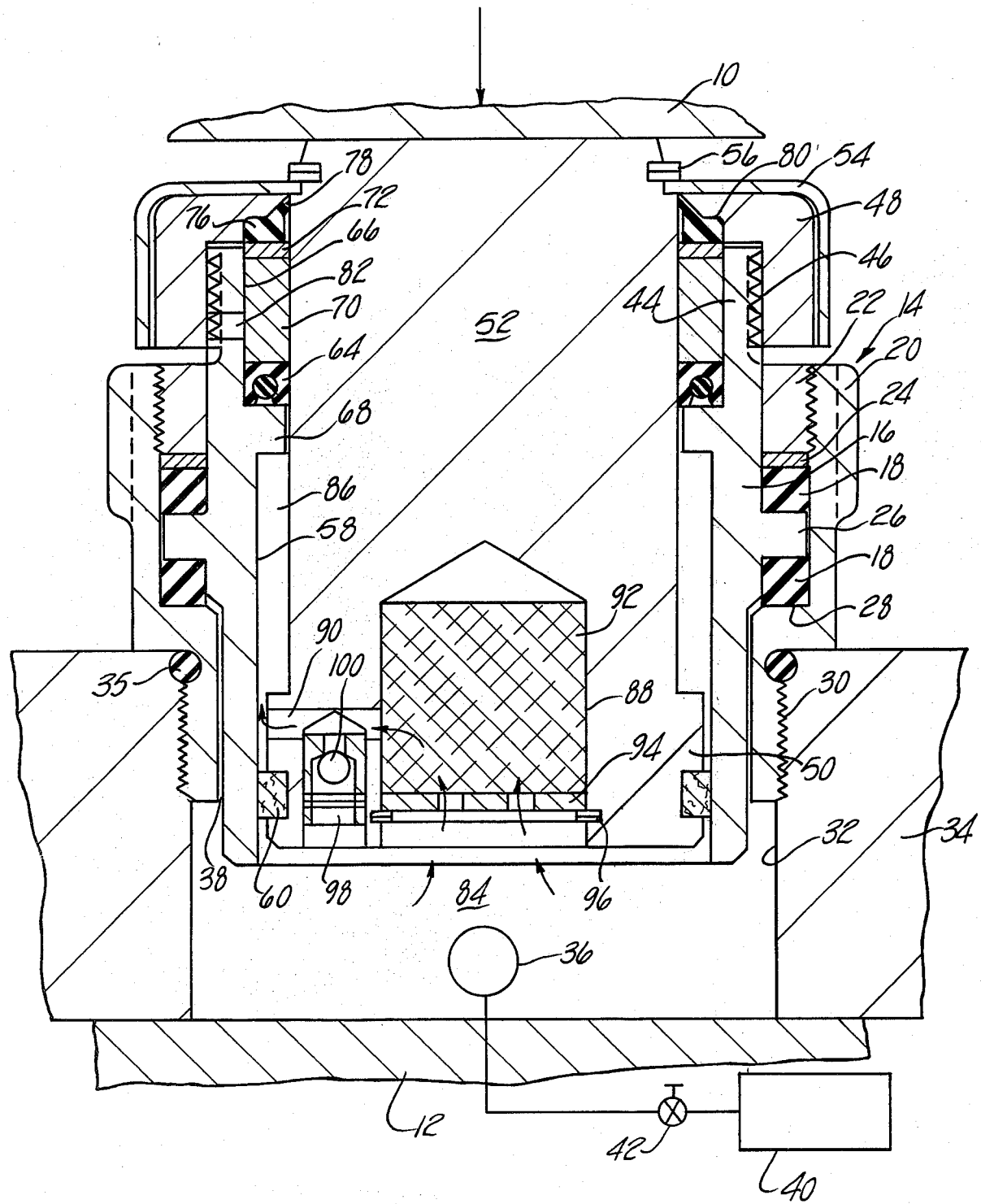

United States Patent [19]

Wallis

[11] 4,342,448
[45] Aug. 3, 1982

[54] GAS-OPERATED CYLINDER

[76] Inventor: Bernard J. Wallis, 25200 Trowbridge Ave., Dearborn, Mich. 48124

[21] Appl. No.: 137,369

[22] Filed: Apr. 4, 1980

[51] Int. Cl.³ .............................................. F16F 9/02
[52] U.S. Cl. ..................................... 267/119; 92/159;
92/168; 184/18; 188/322.17; 222/551; 267/64.28
[58] Field of Search ........................... 188/322, 322.17; 267/65 R, 118, 64 R, 119, 129, 130, 64.28; 92/128, 159, 160, 168; 184/18, 29; 74/18.2; 222/519, 551

[56] References Cited

U.S. PATENT DOCUMENTS

| | | | |
|---|---|---|---|
| 764,886 | 7/1904 | Donnenwerth | 92/159 |
| 1,229,029 | 6/1917 | Burbage | 222/551 |
| 2,518,097 | 8/1950 | Thornhill | 267/65 R |
| 3,365,188 | 1/1968 | Rumsey | 267/64.28 |
| 3,791,495 | 2/1974 | Keijzer | 188/322 |
| 4,005,763 | 2/1977 | Wallis | 267/119 |
| 4,044,859 | 8/1977 | Wallis | 184/18 |
| 4,057,236 | 11/1977 | Hennells | 267/65 R |
| 4,076,103 | 2/1978 | Wallis | 267/119 |
| 4,085,925 | 4/1978 | Peddinghaus et al. | 267/64 R |

FOREIGN PATENT DOCUMENTS

| | | | |
|---|---|---|---|
| 1146448 | 11/1959 | France | 92/168 |
| 809682 | 3/1959 | United Kingdom | 267/64 R |

*Primary Examiner*—Edward R. Kazenske
*Attorney, Agent, or Firm*—Barnes, Kisselle, Raisch & Choate

[57] ABSTRACT

A gas-operated piston cylinder assembly arranged between upper and lower die members of a press. The lower end of the cylinder communicates with a source of high pressure gas and also communicates through a passageway with the upper rod end of the cylinder which is sealed from the surrounding atmosphere. The piston rod has a cross sectional area only slightly smaller than the piston. The passageway between the lower and the upper ends of the cylinder contains a lubricant impregnated member and a by-pass controlled by a check valve which allows gas flowing from the rod end of the cylinder to the lower end thereof to bypass the lubricant impregnated member.

4 Claims, 2 Drawing Figures

GAS-OPERATED CYLINDER

This invention relates to fluid cylinders, and, more particularly, to fluid springs used between die members of a stamping press.

In metal die forming operations it is common practice to yieldably restrain relative movement between the opposed die members by means of fluid springs therebetween in the form of piston-cylinder assemblies connected at one side thereof to a reservoir of gas under pressure, such as nitrogen, and communicating at the other side thereof with the surrounding atmosphere. An arrangement of this type is illustrated in my prior U.S. Pat. No. 4,005,763. Since one end of the cylinder communicates with the surrounding atmosphere, it is important in such arrangements to minimize or prevent the ingress of contaminants from the surrounding atmosphere into the cylinder. If dirt and other contaminants are permitted to enter the cylinder, the life of such assemblies is relatively short. One such arrangement for avoiding this problem is illustrated in my prior U.S. Pat. No. 4,154,434 where a collapsible boot is arranged around the portion of the piston rod projecting outwardly from the cylinder. While the arrangements heretofore proposed have achieved some degree of success, they are for the most part costly and require periodic servicing.

The present invention has for its object the provision of a fluid die spring which avoids entirely the problem of ingress of contaminants from surrounding air into the cylinder.

More specifically, it is an object of this invention to provide a fluid die spring wherein the interior of the cylinder has no communication whatever with the surrounding atmosphere.

A further object of this invention is to provide a lubricating arrangement for the working surfaces of a fluid die spring that is economical in construction and long-lasting with respect to the supply of lubricant.

Figure 2:
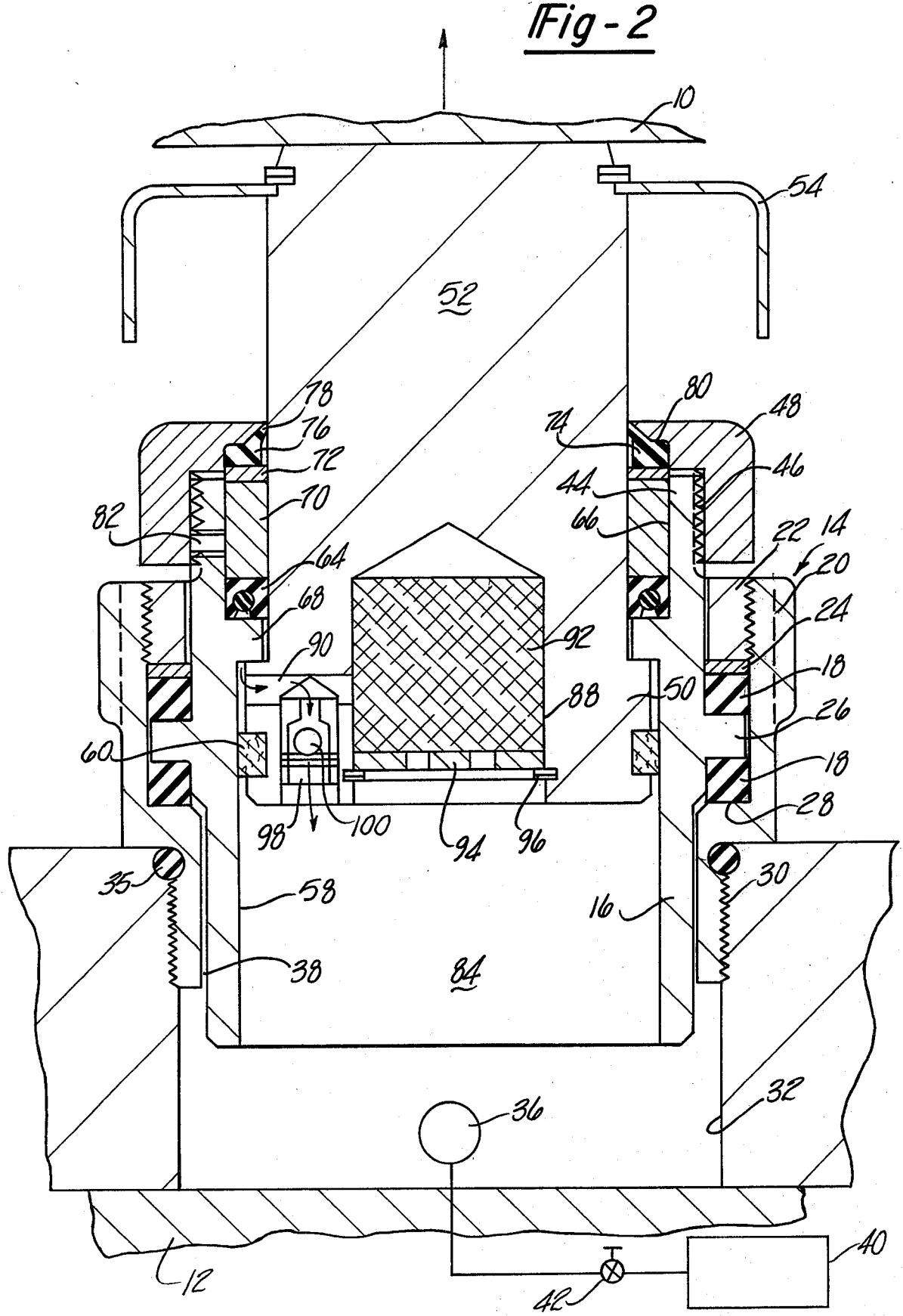

Other objects, features and advantages of the present invention will become apparent from the following description and accompanying drawings, in which:

FIG. 1 is a vertical sectional view through a fluid spring of the present invention showing the piston in its lowermost position; and FIG. 2 is a view similar to FIG. 1 and showing the piston in its uppermost position.

In FIG. 1 there is illustrated an upper movable die member 10 and a lower fixed die member 12. Between these die members there is arranged a piston-cylinder assembly generally designated 14. The piston-cylinder assembly 14 comprises a cylinder 16 which is mounted as by axially spaced rubber sealing rings 18 in an outer cylindrical sleeve 20. Cylinder 16 is secured within sleeve 20 by means of a threaded clamping ring 22 which urges a metal washer 24 downwardly against the upper rubber ring 18. The two rings 18 are separated by a flange 26 on cylinder 16 and the lower ring 18 is sealed on a radially inwardly extending shoulder 28 on sleeve 20. Sleeve 20 is threaded as at 30 into a bore 32 formed in a manifold plate 34 mounted on lower die member 12. Sleeve 20 is sealed in bore 32 by an O-ring 35. A passageway 36 connects bore 32 and thus the lower open end 38 of cylinder 16 with a reservoir 40 containing a gas (such as nitrogen) under a predetermined high pressure. Passageway 36 is controlled by a shut off valve 42. The arrangement of cylinder 16 in sleeve 20 permits the cylinder to tilt slightly relative to the central vertical axis of sleeve 20 in the event that the direction of movement of die member 10 is slightly inclined to the central axis of cylinder 16. This general arrangement is completely described in my Prior U.S. Pat. No. 3,947,005.

The upper side wall portion 44 of cylinder 16 is threaded around its outer periphery as at 46 for engagement with an internally threaded cap 48 at the upper end of the cylinder.

Within cylinder 16 there is arranged a piston 50 to which a piston rod 52 is fixedly connected. Piston rod 52 extends upwardly through a central aperture in cap 48 for engagement with the upper die member 10. A dirt shield 54 is mounted on the upper end of piston rod 52 as by snap rings 56. Piston 50 has a diameter slightly smaller than the bore 58 of cylinder 16 and is slidably guided therein by an annular bearing 60. The piston rod 52 is sealed in cylinder 16 by an annular seal 64 which is seated in the lower end of a counterbore 66 at the upper end of the cylinder. Counterbore 66 is separated from the cylinder bore 58 by a shoulder 68. Seal 64 is of the type that is adapted to expand into sealing engagement with piston rod 52 in response to pressure on the seal from the bottom side thereof.

Seal 64 is retained in place by an annular bearing 70 for the piston rod, a metal washer 72 and a piston rod wiper 74. These members are retained in the assembled condition by cap 48. Wiper 74 has a body portion 76 of generally rectangular cross section and a conically shaped lip 78 which projects upwardly and radially inwardly from the body portion 76 into wiping engagement with the outer periphery of rod 52. Cap 48 is formed with an annular recess 80 which conforms in shape with the outer peripheral contour of wiper 74. At one side thereof the threaded wall portion 44 of cylinder 16 is provided with a through aperture 82 which, in the assembled condition of the cylinder, is located at least slightly above seal 64.

It will be observed that the cross sectional area of piston 50 is only slightly greater than the cross sectional area of piston rod 52. The working chamber 84 of the cylinder below piston 50 is connected with the idle chamber 86 above the piston 50 by means of a cavity 88 which is open at the lower face of the piston and a radial passageway 90 extending outwardly from cavity 88 above bearing 60. Within cavity 88 there is contained a lubricant impregnated cartridge 92, for example, a small cell sponge or a sintered bronze insert, which permits the flow of high pressure gas from the working chamber 84 to the idle chamber 86 in a somewhat restricted manner. Insert 92 is retained within cavity 88 by means of an apertured plate 94 which is held in place by a retainer ring 96. Radial passageway 90 is connected directly with working chamber 84 by means of a bypass passageway 98 controlled by a check valve 100. Check valve 100 closes bypass passageway 98 when the pressure in the working chamber 84 exceeds the pressure in idle chamber 86 and opens when the pressure in idle chamber 86 exceeds the pressure in working chamber 84.

When the ram of the press is in its uppermost position the upper die member 10 is in the elevated position illustrated in FIG. 2 and the pressure of the gas in working chamber 84 urges piston 50 upwardly so that its upper end remains engaged with the upper die member 10. As the piston moves upwardly from the position shown in FIG. 1 to the position shown in FIG. 2 the idle chamber 86 is reduced in size, thereby tending to increase the pressure of the gas therein to a value exceeding that in the working chamber 84. Thus, the gas escapes from the idle chamber 86 through passageway 90 and then directly to the working chamber 84 through bypass passageway 98. Since the flow of gas through cartridge 92 is substantially more restricted than the free flow through bypass passageway 98, substantially no gas flows through the lubricating cartridge 92 when the piston moves upwardly. On the other hand, when the ram of the press descends, upper die member 10 lowers and forces piston 50 downwardly in cylinder bore 58. When this occurs the pressure of the gas in the expanding idle chamber 86 tends to be less than the pressure of the gas in working chamber 84, thus closing check valve 100 and causing the gas to flow through cartridge 92 and passageway 90 into idle chamber 86. The lubricant in cartridge 92 is entrained in the gas flowing therethrough to thus carry lubricant to the working surfaces of the piston and cylinder. With this arrangement cartridge 92 is capable of supplying lubricant to the working surfaces of the cylinder and piston over a relatively long period of time, not only because of the large size of cavity 88, but also because the gas flows through the cartridge and into the idle chamber 86 only during the down stroke of the piston. Gas flow through cartridge 92 in the reverse direction would be of no practical value because it would simply deposit lubricant in the chamber defined by bore 32.

While the dirt shield 54 tends to prevent an excessive amount of contaminants (such as dirt and the like) from accumulating on piston rod 52, it is impossible under the environment under which such fluid springs operate to prevent all contaminants from coming into contact with the piston. Thus, the wiper 74 is required to perform the much needed function of keeping the piston rod relatively clean so that the amount of dirt and other contaminants reaching the interior surfaces of the piston and cylinder is kept to a minimum. The construction and arrangement of wiper 74 will, however, provide a very efficient and effective wiping action on the piston rod, even though the wiper and/or the piston rod may be subjected to wear over a long period of time. This results from the fact that the high pressure of the gas is exerted against the bottom side of the seal 64 and tends to displace the seal upwardly. Bearing 70 and washer 72 provide rigid spacers between seal 64 and wiper 74 such that the upward force on seal 64 tends to compress wiper 74. As the wiper compresses, the conical lip 78 is deflected inwardly by the correspondingly shaped recess 80 in cap 48 into tighter engagement with the outer periphery of the piston rod 52. The fact that after a considerable period of time seal 64, bearing 70 and washer 72 may be displaced axially upwardly a slight amount will not adversely affect the operation of the fluid spring. Thus, even though considerable wear may occur, wiper 74 provides a very effective wiping action on the piston rod.

Occassionally it will become necessary to service the fluid spring illustrated herein for the purpose of replacing a seal, a bearing or the oil lubricating cartridge. This requires disassembly of the unit. The aperture 82 is provided to insure complete safety when the unit is disassembled. Before disassembly valve 42 is closed to cut off communication between reservoir 40 working chamber 84. However, even with valve 42 in the closed condition, the cylinder is subjected to the same high pressure that it was prior to closing valve 42. Aperture 82 provides a means for automatically and safely bleeding this high pressure to atmosphere while the unit is being disassembled. To disassemble the unit it is necessary to remove cap 48. When cap 48 is rotated to progressively displace it upwardly, the high pressure of the gas in idle chamber 86 will cause seal 64, bearing 70 and washer 72 to be displaced upwardly in unison with cap 48. Before the cap is completely removed from the upper end of the cylinder, seal 64 will have been displaced upwardly sufficiently beyond the lower edge of aperture 82 to permit the gas in the cylinder to escape through aperture 82. Thus, by the time the cap 48 is threaded completely off the upper end of the cylinder, the pressure within the cylinder will have been reduced to atmospheric and thus allow complete removal of the cap from the cylinder with safety.

I claim:

1. In a press, a fluid spring assembly for use between a pair of metal die forming members which move relatively toward and away from each other, said fluid spring assembly comprising a fluid cylinder fixedly mounted at one end thereof on one of said die members, said cylinder having an axially extending bore in which a close fitting piston is axially slideable, said piston dividing the cylinder into a working chamber and an idle chamber which vary inversely in size in response to reciprocation of the piston, said working chamber communicating with a reservoir of gas under relatively high pressure, said piston having a piston rod projecting axially through the idle chamber and outwardly through the other end of the cylinder for engagement with the other die member, said piston rod having a cross section smaller than the piston so that the cross sectional area of the piston exposed to the idle chamber is less than the cross sectional area of the piston exposed to the working chamber, means forming a passageway extending between the working chamber and the idle chamber to permit relatively free flow of the gas therebetween in response to reciprocation of the piston, said other end of the cylinder having an end wall provided with a central aperture through which the piston rod projects, said cylinder bore being provided with a circumferentially extending shoulder spaced a fixed distance axially from said end wall, an annular seal seated on said shoulder and engaging the periphery of the piston rod to prevent leakage of gas from the idle chamber outwardly of the cylinder through said aperture, said seal being axially displaceable from seated engagement with said shoulder toward said end wall in response to the axial force exerted thereon by the high pressure gas in said idle chamber, said aperture being defined at least in part by a conical surface which inclines radially inwardly in a direction axially outwardly of the cylinder, an annular rod wiper disposed in said aperture, said rod wiper having an axially inner body and an axially outer lip, the radially outer surface of said lip conforming in shape to and being seated against said conical surface, the inner periphery of said lip being in sealing engagement with the outer periphery of the piston rod, a rigid spacer extending axially between said annular seal and the axially inner end of the rod wiper body, said spacer being axially displaceable in said cylinder toward said end wall by the pressure of the gas in the idle chamber exerted axially against said seal, said wiper being formed of a material that compresses axially in response to the axial force exerted thereon by the axially displaceable spacer whereby the pressure of the gas in the idle chamber is exerted axially against the axially inner end of the wiper by said seal and the axially displaceable spacer to axially compress the wiper and, as the inner periphery of the wiper lip tends to enlarge due to wear from engagement with the piston rod, the rod wiper compresses axially as a result of said axial force thereon and as a result of said compression, the conical surface of said aperture causes the wiper lip to be cammed progressively radially inwardly to maintain said sealing engagement with the outer periphery of the piston rod.

2. The combination called for in claim 1 wherein said conical surface forms the axially outer end portion of said aperture, the axially inner end portion of said aperture being formed as a generally cylindrical bore having a diameter greater than the largest diameter of said conical surface and being connected therewith by a radially inwardly extending shoulder, the body of said rod wiper being disposed in the axially inner end portion of said aperture and being seated against said last-mentioned shoulder.

3. The combination called for in claim 1 wherein said end wall comprises a cap removably secured to said other end of the cylinder.

4. The combination set forth in claim 1 wherein the inner periphery of the portion of the rod wiper axially inwardly of said lip is spaced radially outwardly from the outer periphery of the piston rod so as to form an annular clearance space therebetween.

* * * * *